US010528519B2

(12) United States Patent
Rosenbluth

(10) Patent No.: US 10,528,519 B2
(45) Date of Patent: Jan. 7, 2020

(54) COMPUTING IN PARALLEL PROCESSING ENVIRONMENTS

(71) Applicant: Mellanox Technologies Ltd., Yokneam (IL)

(72) Inventor: Mark Rosenbluth, Uxbridge, MA (US)

(73) Assignee: Mellanox Technologies Ltd., Yokneam (IL)

( * ) Notice: Subject to any disclaimer, the term of this patent is extended or adjusted under 35 U.S.C. 154(b) by 108 days.

(21) Appl. No.: 15/584,327

(22) Filed: May 2, 2017

(65) Prior Publication Data

US 2018/0322057 A1 Nov. 8, 2018

(51) Int. Cl.
G06F 12/00 (2006.01)
G06F 12/08 (2016.01)
G06F 13/00 (2006.01)
G06F 15/80 (2006.01)

(52) U.S. Cl.
CPC .................................. G06F 15/80 (2013.01)

(58) Field of Classification Search
CPC ............... G06F 12/0831; G06F 12/084; G06F 12/0813; G06F 12/0817; G06F 12/0815; G06F 12/082; G06F 2212/1016; G06F 2212/1032; G06F 15/173; G06F 2212/314
USPC ......................................................... 711/141
See application file for complete search history.

(56) References Cited

U.S. PATENT DOCUMENTS

| | | | |
|---|---|---|---|
| 5,835,766 A | 11/1998 | Iba | |
| 6,334,172 B1* | 12/2001 | Arimilli | G06F 12/0815 711/122 |
| 6,430,657 B1 | 8/2002 | Mittal | |
| 6,535,958 B1 | 3/2003 | Fuoco | |
| 7,577,820 B1* | 8/2009 | Wentzlaff | G06F 15/16 712/10 |
| 7,805,575 B1* | 9/2010 | Agarwal | G06F 12/0811 711/141 |
| 8,250,555 B1* | 8/2012 | Lee | G06F 8/445 717/132 |
| 8,738,860 B1 | 5/2014 | Griffin | |
| 9,514,006 B1 | 12/2016 | Busaba | |
| 9,542,316 B1* | 1/2017 | Forrest | G06F 12/0815 |
| 9,842,031 B1 | 12/2017 | Kharatishvill | |
| 2001/0049714 A1 | 12/2001 | Kikuchi | |
| 2002/0172199 A1 | 11/2002 | Scott | |
| 2006/0143395 A1 | 6/2006 | Zohar | |
| 2007/0203910 A1 | 8/2007 | Ferguson | |
| 2008/0104332 A1* | 5/2008 | Gaither | G06F 12/0815 711/141 |
| 2008/0183979 A1 | 7/2008 | Larson | |
| 2010/0064206 A1* | 3/2010 | Moyer | G06F 11/1064 714/800 |

(Continued)

*Primary Examiner* — Mohamed M Gebril

(74) *Attorney, Agent, or Firm* — Fish & Richardson P.C.

(57) ABSTRACT

A computing system comprises one or more cores. Each core comprises a processor. In some implementations, each processor is coupled to a communication network among the cores. In some implementations, a switch in each core includes switching circuitry to forward data received over data paths from other cores to the processor and to switches of other cores, and to forward data received from the processor to switches of other cores. Also disclosed is a cache coherency protocol that includes both an "Owned" state and a Forward state together with protocol mechanism for handling various memory requests.

20 Claims, 4 Drawing Sheets

(56) References Cited

U.S. PATENT DOCUMENTS

| | | | |
|---|---|---|---|
| 2010/0325367 A1* | 12/2010 | Kornegay | G06F 12/0804 |
| | | | 711/143 |
| 2011/0029498 A1 | 2/2011 | Ferguson | |
| 2013/0151750 A1 | 6/2013 | Kanigicherla | |
| 2013/0191599 A1 | 7/2013 | Busaba | |
| 2013/0243190 A1 | 9/2013 | Yang | |
| 2013/0339805 A1 | 12/2013 | Aho | |
| 2013/0346708 A1 | 12/2013 | Nashimoto | |
| 2014/0032853 A1* | 1/2014 | Lih | G06F 12/0817 |
| | | | 711/141 |
| 2014/0101390 A1* | 4/2014 | Sohi | G06F 12/0815 |
| | | | 711/144 |
| 2014/0156950 A1* | 6/2014 | Chew | G06F 12/0831 |
| | | | 711/146 |
| 2014/0281270 A1* | 9/2014 | Neefs | G06F 12/0813 |
| | | | 711/143 |
| 2014/0368524 A1 | 12/2014 | Srinivasan | |
| 2015/0006783 A1* | 1/2015 | Chew | G06F 12/0815 |
| | | | 711/6 |
| 2015/0150003 A1 | 5/2015 | Emelyanov et al. | |
| 2015/0178206 A1* | 6/2015 | Chamberlain | G06F 12/0817 |
| | | | 711/122 |
| 2015/0234745 A1 | 8/2015 | Roy | |
| 2016/0239432 A1 | 8/2016 | Zhuang | |
| 2016/0267018 A1 | 9/2016 | Shimizu | |
| 2016/0378658 A1 | 12/2016 | Gschwind | |
| 2016/0378659 A1 | 12/2016 | Gschwind | |
| 2017/0039144 A1 | 2/2017 | Wang | |
| 2017/0060745 A1* | 3/2017 | Wicki | G06F 12/0833 |
| 2017/0116118 A1 | 4/2017 | Artieri | |
| 2017/0322885 A1 | 11/2017 | Mikherjee | |
| 2017/0357446 A1* | 12/2017 | Moyer | G06F 12/0891 |
| 2017/0371786 A1* | 12/2017 | Srinivasan | G06F 12/0811 |
| 2018/0081808 A1* | 3/2018 | Geetha | G06F 12/0817 |
| 2018/0107604 A1 | 4/2018 | Dooley | |
| 2018/0117810 A1 | 5/2018 | Gschwind | |

* cited by examiner

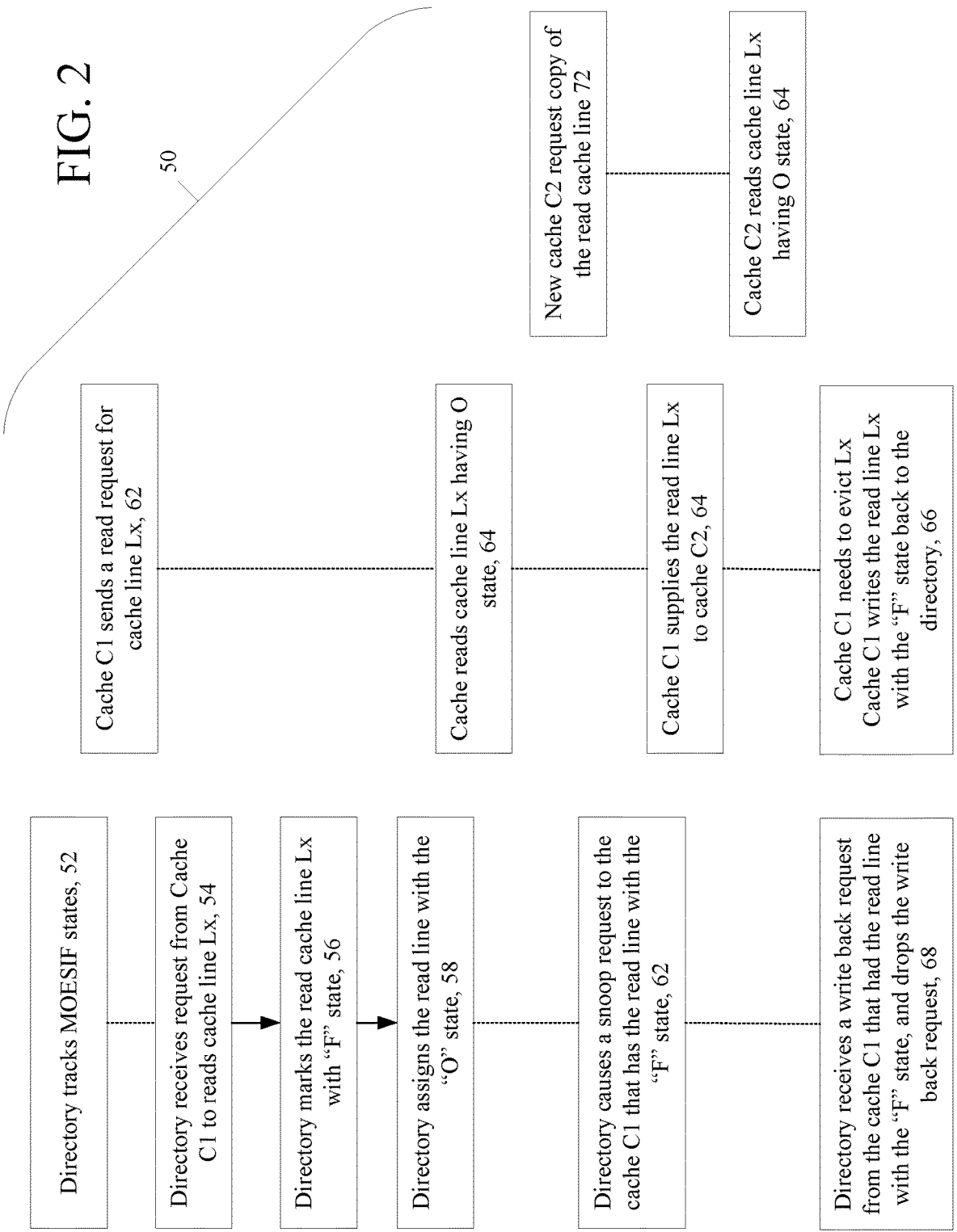

COMPUTING IN PARALLEL PROCESSING ENVIRONMENTS

BACKGROUND

This description relates to computing in parallel processing environments.

FPGAs (Field Programmable Gate Arrays) and ASICs (Application Specific Integrated Circuits) are two exemplary approaches for implementing customized logic circuits. Costs associated with ASICs include verification, physical design, timing closure, and non-recurring costs. Unlike an ASIC, an FPGA is reprogrammable in that it can be reconfigured for each application and changed even after the design has been shipped to customers, much like software can be updated. However, FPGAs are typically more expensive than an ASIC. FPGAs typically consume more power and have lower performance compared to an ASIC.

Multicore systems (e.g., tiled processors) use parallel processing to achieve some features of both ASICs and FPGAs. For example, some multicore systems are power efficient like an ASIC because they use custom logic for some functions, and reconfigurable like FPGAs because they are programmable in software. Other multicore systems are not tile based.

Multicore systems include cache memory and cache controller units. Cache can be multi-level, typically two or three levels and caches can be distributed and can be associated with cores of a multi core system. When caches are multi-level and/or distributed, generally it is necessary to have a coherency scheme. Several coherency schemes are known, including the so called "MESI protocol" an invalidate-based cache coherence protocol commonly used to with write-back caches. In MESI protocol there are four states—Modified, Exclusive, Shared, and Invalid.

Another cache coherency protocol is a variation of the MESI protocol, which includes an additional state, "an Owned state" and is commonly referred to as the MOESI protocol. The advantage of including an Owned state is that, while an owned line can be shared among many caches, the cache that owns the owned line has the exclusive right to modify the line, i.e., make the owned line a "dirty line" (a line that is modified within a cache, but not memory). The cache with the owned state for the dirty line has the responsibility to provide the latest value to other caches more broadly "new reader devices", and to write the dirty line back to memory upon eviction from the owned cache "write-back" to memory. In this scheme all caches that have read the dirty line will have the same value, which is a different value from the value in memory (until the line is evicted from the cache and written back to memory).

Another variation of the MESI protocol is to add a Forward state (MESIF). The advantage of a Forward state is that one cache is designated as the one that must provide a cache line to new reader devices. That removes bandwidth from memory and is also potentially faster than having to read the cache line from memory. The cache with the forward state "set" notifies a cache directory when the cache evicts the line because that cache is no longer able to provide the cache line. However, the evicted line does not need to be written back to memory (as in the Owned state) because it has not been modified.

SUMMARY

According to an aspect, a system includes a multicore processor device including a plurality of cores, with multiple ones of the plurality of cores each including a processor, and switching circuitry configured to couple the processor to a network among the plurality of cores. The system further includes a directory that tracks status of cached lines and a cache controller for implementing a cache coherency, the cache controller configured to receive by the directory a read request from a reader device to read a cache line, change in the directory a first state of the requested cache line to a forward state, and supply the requested read cached line with an owned state to the requesting reader device.

Other aspects include cache controllers, methods, and multicore processors, as well as computer program products that are tangible stored in a non-transitory manner on hardware storage or memory devices, include semiconductor, magnetic, optical storage, as well as semiconductor random access, read only, programmable read only memory.

One or more of the above aspects may include one or more of the following advantages.

A cache coherency protocol that includes both an "Owned" state and a Forward is provided. By supplying a reader device with a copy of a cache line in an owned state, but marking it as an F state in the directory, when a new reader device requests a copy, the cache with F state is snooped, and supplies the data. However, when the cache with F state needs to evict the line it writes the evicted line back to the directory. The directory knowing that the evicted cache line was in the F state can drop the write, saving memory bandwidth.

Other features and advantages of the invention will become apparent from the following description, and from the claims.

DESCRIPTION OF DRAWINGS

FIG. 2 is a flowchart of a method of a coherency policy having a cache forward state and an owned state.

DESCRIPTION

1 Exemplary System Overview

The system described in this section (with reference to FIGS. 1A and 1B) provides an overview of various aspects of a parallel processing environment that can be used for a variety of the techniques described in other sections.

A multicore processor can be manufactured as a chip containing multiple processing engines or cores. Using multiple cores to process applications can provide greater computing throughput and also lower power. There are many challenges to building a multicore processor. These include the challenges of how to connect the cores to each other efficiently, how to manage data sharing between the cores, how to supply data from input-output devices to the cores in a coherent manner, and how to construct operating systems for multicore processors. Bus based multicore chips use a bus to connect the cores, but buses may be a throughput bottleneck and may also consume a lot of power. An alternative way to connect the cores is to use a point-to-point network such as a mesh network or a ring network. Networks such as a mesh have switches arranged in a grid pattern in which neighboring switches are connected to each other. When the cores include a switch component for a network such as a mesh, the cores can be laid out in a simple rectangular tiled pattern. Such multicore chips are called tiled multicore processors. Because the conductor paths are short in tiled multicore processors, signals can travel short distances when neighboring cores need to communicate. Tiled multicore processors generally consume lower power than bus based multicore processors.

Figure 1A:
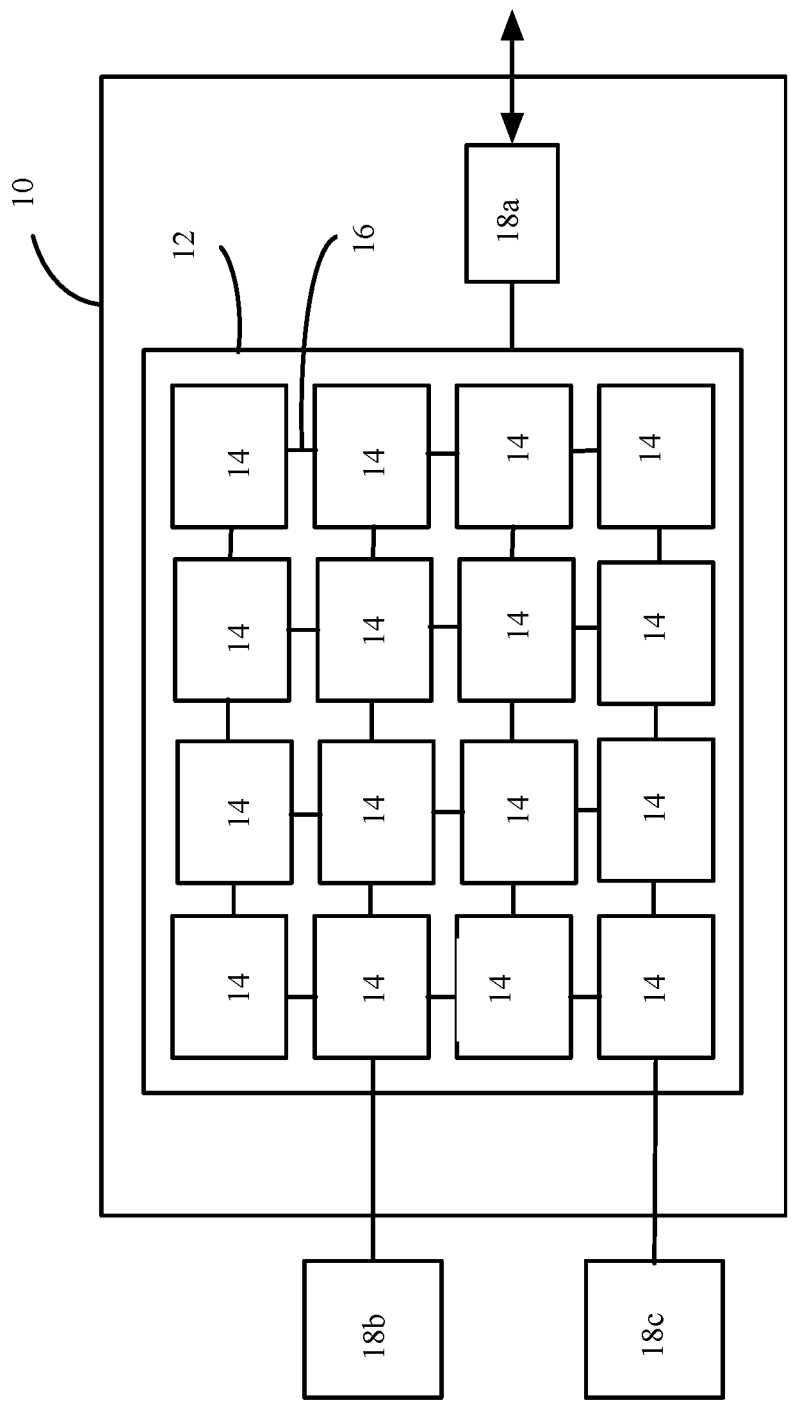
FIG. 1A is a block diagram of a tiled integrated circuit.

Referring to FIG. 1A, an integrated circuit 10 (or "chip") includes an array 12 of interconnected tiles 14. Each of the tiles 14 is a functional unit that includes a processor (or "processor core") and a switch that forwards data from other tiles to the processor and to switches of other tiles over data paths 16. The switch is coupled to the processor so that data can be sent to or received from processors of other tiles over the communication fabric formed by the switches and data paths. The integrated circuit 10 includes other on-chip circuitry such as input/output (I/O) interface circuitry to couple data in and out of the circuit 10, and clock distribution circuitry to provide clock signals to the processors of the tiles.

The integrated circuit 10 shown in FIG. 1A includes a two-dimensional array 12 of (e.g., rectangular) tiles 14 with data paths 16 between neighboring tiles to form a mesh network. The data path 16 between any two tiles can include multiple conductor paths (or "wires") to support parallel channels in each direction. Optionally, specific sets of conductors between two tiles can be dedicated to different mesh networks that can operate independently.

Alternative network configurations include buses, rings, crossbars, hypercubes, trees, or networks having paths that extend to diagonal neighbors or to tiles that are multiple rows or columns away. Other configurations include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 16 from one or more tiles at the edge of the network can be coupled out of the array 12 of tiles 14 (e.g., over I/O pins) to an on-chip device 18a, an off-chip device 18b, or a communication channel interface 18c, for example. Multiple conductors of one or more parallel channels can be multiplexed down to a fewer number of pins or to a serial channel interface. For example, the conductors for one or more channels can be multiplexed onto a high-speed serial link (e.g., SerDes) or a memory controller interface (e.g., a memory controller for DDR or Dynamic RAM—also known as DRAM). The memory controller can be implemented off-chip or in logic blocks within a tile or on the periphery of the integrated circuit 10.

The following exemplary implementations are described in the context of tiles that have the same structure and functionality. Alternatively, there can be multiple "tile types" each having different structure and/or functionality. For example, tiles that couple data off of the integrated circuit 10 can include additional circuitry for I/O functions.

Figure 1B:
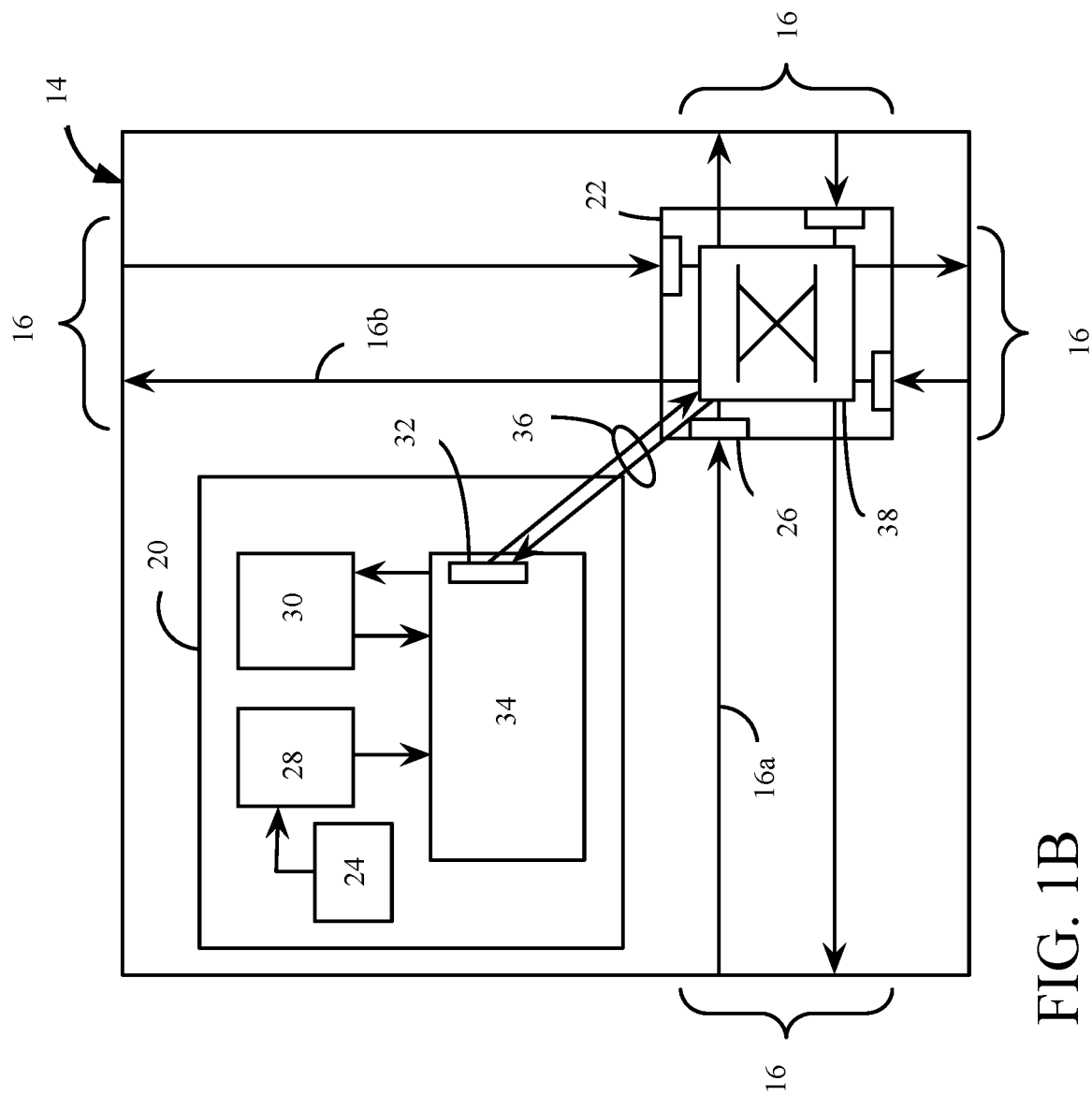
FIG. 1B is a block diagram of a tile.

Referring to FIG. 1B, a tile 14 includes a processor 20, a switch 22, and sets of incoming conductors 16a and outgoing conductors 16b that form the data paths 16 for communicating with neighboring tiles. The processor 20 includes a program counter 24, an instruction memory 28, a data memory 30, and a pipeline 34. The processor 20 can use any of a variety of pipelined architectures. The pipeline 34 includes pipeline registers, functional units such as one or more arithmetic logic units (ALUs), and temporary storage such as a register file. The stages in the pipeline 34 include, for example, instruction fetch and decode stages, a register fetch stage, instruction execution stages, and a write-back stage.

Either or both of the instruction memory 28 and data memory 30 can be configured to operate as a cache for off-chip memory. The cache hierarchy can take many forms, and the description here is just one example. For example, the instruction memory 28 includes an instruction cache that caches instructions, which can be a level 1 instruction cache (L1I), and the data memory 30 includes a data cache that caches data, which can be a level 1 data cache (L1D). Both the L1I cache and the L1D cache can be backed up by a level 2 unified cache (L2U) that is usually larger in size than either of the L1 caches. The caches are controlled by a cache controller.

On a cache miss from the L1I or L1D caches, the L2U cache is checked. If the data is found in the L2U cache, then a cache miss can be averted. If the instruction or data is not found in the L2U, then the instruction or data is fetched from outside the tile. In some implementations, the processor checks the cache in another tile called the home tile for that particular address that missed. This way, the L2U caches in the other tiles serve as a large distributed L3 cache. In other implementations the L2 cache need not be the cache at the home. If the home tile has an entry for the data item (within a home location of a home cache in the home tile), the home tile can supply the data item to the requesting tile. If even the home tile causes a cache miss, then, as an example, the home tile handles the cache miss by sending the cache request to external memory (to DRAM typically) and obtains the data item from the external memory. The cache miss from the requesting tile gets turned into a message that traverses the network to get to the home tile. Similarly, the miss from the home tile to DRAM traverses the network.

Sometimes, instead of checking a home tile on a cache miss to the cache within a tile, the request is sent directly outside the chip to external DRAM memory.

The tile 14 can also include a cache controller that performs actions to ensure that cache coherence is maintained in the whole chip. Typically, the cache coherence information for a given cache line is maintained at the home tile for that cache line. The coherence information is stored in a directory to store the current state of the cache line. The home location for a given cache line is stored in a structure that performs physical address to home location translation such as a System Address Map (SAM) used in the ARM® (ARM, LTD) architecture. The home location, within a home tile, for a given cache line can also be determined by hashing the cache line address to yield a home location. The home location can also be modified as the program executes. Data that has a home location in a home cache of a particular home tile is said to be "homed in" that particular tile.

The processor 20 can be multithreaded and/or have capabilities of a Very Long Instruction Word (VLIW) processor, a superscalar processor, or a vector processor.

Together the switches 22 in a multicore chip provide the communications infrastructure for all the cores. Switches can be built in many ways. As one example, the switch 22 includes input buffers 26 for temporarily storing data arriving over incoming conductors 16a, and switching circuitry 38 (e.g., a crossbar fabric) for forwarding data to outgoing conductors 16b or the processor 20. The input buffering provides pipelined data channels in which data traverses a data path 16 from one tile to a neighboring tile in predetermined number of clock cycles (e.g., a single clock cycle). This pipelined data transport enables the integrated circuit 10 to be scaled to a large number of tiles without the need to limit the clock rate to account for effects due to conductor lengths such as propagation delay or capacitance. (Alternatively, the buffering could be at the output of the switching circuitry 38 instead of, or in addition to, the input.)

A tile 14 controls operation of the switch 22 using either the processor 20, or separate switch processor dedicated to controlling the switching circuitry 38. Separating the control of the processor 20 and the switch 22 allows the processor 20 to take arbitrary data dependent branches without disturbing the routing of independent messages passing through the switch 22.

In some implementations, the switch 22 includes a switch processor that receives a stream of switch instructions for determining which input and output ports of the switching circuitry to connect in any given cycle. For example, the switch instruction includes a segment or "sub-instruction" for each output port indicating to which input port it should be connected. In some implementations, the processor 20 receives a stream of compound instructions with a first instruction for execution in the pipeline 34 and a second instruction for controlling the switching circuitry 38.

The switch instructions enable efficient communication among the tiles for communication patterns that are known at compile time. This type of routing is called "static routing." An example of data that would typically use static routing are operands of an instruction to be executed on a neighboring processor.

The switch also provides a form of routing called "dynamic routing" for communication patterns that are not necessarily known at compile time. Dynamic routing is also used for messages that result from cache misses or other cache coherence related transactions. In dynamic routing, circuitry in the switch 22 determines which input and output ports to connect based on header information in the data that is being dynamically routed during execution. A tile can send a message to any other tile by generating the appropriate address information in the message header. The tiles along the route between the source and destination tiles use a predetermined routing approach. For example, one routing approach is shortest Manhattan Routing (also known as dimension-ordered routing), which refers to routing along a first dimension followed by a second perpendicular dimension (where the distance between two points is measured by adding line segments that are arranged in a grid like pattern, with the line segments at right angles to each other, and not the straight line joining the two points). The number of hops along a route is deterministic but the latency depends on the congestion at each tile along the route. Examples of data traffic that would typically use dynamic routing are memory access traffic (e.g., to handle a cache miss) or interrupt messages.

The switch 22 includes dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

The switch 22 is coupled to the processor 20 over processor coupling wires 36. For fast (e.g., low latency) communication between tiles of neighboring processors, the coupling wires 36 are integrated directly into the pipeline 34. The processor 20 communicates with the switch 22 using distinct opcodes to distinguish between accesses to the static and dynamic network ports. Alternatively, the instructions can use register names to refer to switch ports. For example, the processor can send or receive data by writing to or reading from a register interface that is directly mapped to the input buffers 26 of the switch 22. For data going to or coming from the processor 20, a switch instruction indicates that the switch 22 should couple data to or from a selected register or bypass path of the pipeline 34 over a register mapped pipeline integrated switch interface 32. This pipeline integration allows data to be available to the switch 22 the moment an instruction is executed and the register value is available. In the next cycle the same data could appear at an input buffer of another tile.

To improve the latency of dynamic routing switches the tiles can use route prediction in the switches. With route prediction, a message that comes into an input port of the switch is routed to a given destination port of the switch based on a predicted port number. The prediction for a packet coming in from a given input port can be selected based on the route taken by the previous packet from that input port. If the hardware in the tile (e.g., prediction circuitry) determines that the prediction was incorrect, the hardware can take a few extra cycles to make the right routing decision based on the information in the packet header.

Other optimizations include using wide network channels. A tile can send single word messages containing both the packet header and the data value. The packet header includes information such as route information.

A tile 14 can include various types of memory modules to serve as the instruction memory 28, data memory 30, or as a local memory store for other types of information such as control information for the tile. There can be a small SRAM bank in each tile in addition to a large SRAM bank. There can also be a larger DRAM bank in each tile. Each tile can have mode indicators used to select among these banks. Any of the memory modules can be treated as a cache for a larger memory store outside the tile 14 or the integrated circuit 10. Such external memory (e.g., DRAM) is accessible over high bandwidth paths of one or more dynamic networks. The amount of memory can be chosen to roughly balance the areas devoted to processing and memory, and to match the memory access time and the processor clock.

Functions such as virtual address translation, caching, global shared memory and memory protection can be implemented by any combination of hardware and software (e.g., processor instructions). A tile 14 can include a translation lookaside buffer (TLB) to translate virtual addresses as they come out of the processor 20 on each tile 14. Separate TLBs for instruction and data can also be used. A mode bit for each can turn off translation. Events such as cache miss or translation fault can trigger a trap or interrupt to the processor 20, so that the processor 20 can handle the event in software (using instructions executed by the processor).

The software running on the processor 20 can also use various mechanisms to speedup TLB miss handling. For example, a software TLB miss handler can also maintain a software cache of TLB entries. This software cache used by the software TLB miss handler is also called a TSB.

For example, there can be multiple trap lines (conductors carrying trap signals) to the processor 20. Alternatively, there are few trap lines, but there is a trap vector that the processor 20 can access which encodes the type of trap that occurred. There is a mode indicator, which can allow selecting whether the software or the hardware handles these events. A hardware cache tag file can export a hit/miss status to the software rather than stalling the processor pipeline.

An array 12 of tiles 14 can include one or more interface modules coupled to a switch on the periphery of the array to transfer data to and from an external device such as an I/O device. The interface module includes circuitry to mediate between the communication protocols of the dynamic networks and a communication protocol of the external device. An interface module is able to connect to ports of any of the dynamic network switch points on a tile, but any given interface module may only be connected to a subset of the dynamic networks through a subset of the switch points.

The configuration of the circuitry in a tile 14 can be controlled by local control information stored in the tile. For example, a module in the tile can be turned on or off (to save power for example) or configured into a variety of modes (e.g., to set protection levels) based on the state of a "mode indicator" (e.g., one or more bits) stored in a register or other memory store.

Various parts of the multicore chip, for example, a tile, a processor in a tile, a processor and caches in a tile, can also be selectively shut off to save power. When doing so, the system takes care to selectively shut off or activate certain parts of the tile that are needed for other parts of the system to operate. For example, if a tile's cache is the home cache for a given set of cache lines, then that tile's cache controller and cache might be powered up. Alternatively, they might take a set of actions before they are powered down. These actions can transfer responsibility of processing to other parts of the chip.

As line rates of traffic increasingly rise, it is often not possible to timely execute all of the required applications completely in software. For such cases, a processor 20 can include accelerator circuitry to speedup processing for special functions such as security, compression, network packet processing, etc. The accelerator circuits (accelerators) can be connected directly to a tile or a core, or they can be connected to the periphery of an interconnection network (for example, like an I/O device). The accelerators can also be full participants in coherence protocols and can contain caches. They can also use cache coherence transfers to transfer data between them and the other cores, or they can use DMA (direct memory access) to transfer data from the caches on the rest of the chip to the accelerator memory or caches.

In this situation, it is useful to support a unified interface to the accelerators, such as in a MiCA interface (multicore interface for coprocessor acceleration). MiCA like interfaces can support direct transfer of data from the chip's caches to the accelerators. The accelerators can also be virtualized so that more cores can access the accelerators than there are accelerators.

Accelerators often have a queue of requests from processors (or cores or tiles). They can perform the operations requested in the requests in the order in which the requests were received (for example).

A software system for the tiled integrated circuit 10 includes a compiler that is able to schedule instructions for the processors in each of the cores. The compiler can also prepare communication over the static network, or messages to be sent over the dynamic network.

An exemplary operating system (OS) for the integrated circuit 10 can include a Linux-like kernel or a similar kernel running on a single tile 14. The OS can be a symmetric multiprocessing OS such as SMP Linux which can run on one or more tiles. Threads of SMP Linux running on multiple tiles communicate with each other through coherence shared memory. Alternatively, the OS can be a distributed OS running on multiple tiles sending messages to each of the processes on each of the tiles.

Another software system component that can be included is a hypervisor layer that provides physical device drivers for each physical device. The hypervisor also sets protection levels in the hardware. The hypervisor is responsible to multiplex various operating systems on the physical hardware and physical devices.

Application writers can program each of the cores or tiles in the multicore chip using languages such as C. Similarly, they can program multiple tiles by writing parallel programs using libraries such as pthreads, Message Passing Interface (MPI), or parallel languages such as OpenMP.

The software system can also include libraries that provide additional function such as interfaces that allow the user to access various hardware features directly, such as the registers related to the network, special purpose registers, synchronization operations, user-level message passing, etc.

Various performance enhancements can be made to the distributed cache coherent environment for a multicore processor system. The caches with associated cache controllers contained in the cores (or tiles) form a larger shared cache system for the memory references to an external memory from any of the cores. In other words, a union of all caches (for example, Level 2 caches) in the system serves as a higher level unified cache (for example, level 3 cache). The cache controllers handle cache access and maintain coherence among caches of different cores. Latency reduction techniques for the larger shared cache system are applied to further optimize the memory operation performance. Several features also enable the software executing on the processors of the cores to control cache partition and utilization from the processor and the I/O system while maintaining coherence.

2 Implementing a Cache Forward State in a Coherency Protocol Having an Owned State.

Described below is a cache coherency scheme 50 for multicore systems, which includes aspects of the "MESI protocol," the four states—Modified, Exclusive, Shared, and Invalid, its variation the MOESI protocol that includes the "Owned state" and the MESI protocol that adds a Forward state (MESIF).

There are variations on the MOESI coherency protocol. One such variation is the so called ARM® (ARM, LTD) CHI protocol essentially uses the MOESI states, with different names:

| MOESI Name | CHI Name |
|---|---|
| M Modified | UniqueDirty (UD) |
| O Owned | SharedDirty (SD) |
| E Exclusive | UniqueClean (UC) |
| S Shared | SharedClean (SC) |
| I Invalid | Invalid (I) |

As with the MESI protocol, the ARM CHI protocol does not provide the F state.

Referring now to FIG. 2, a MOESIF protocol 50 is now described. Cache coherency in the multi-core processor operates according to this MOESIF protocol by have a directory tracking six states. In some implementations of the system, e.g., the multicore system above, the directory is a distributed directory, in which each of the tiles has a portion of the directory structure that includes information that tracks all memory lines that are in any of the L2 caches. In other implementations the directory is a centralized directory structure residing at main memory, and which tracks at least all memory lines that are held by caches, and in still other implementations a L2 cluster of L2 caches can have a directory.

In the multi-core system, the MOESIF coherency protocol operates as follows: The directory whether distributed or centralized tracks 52 all six states M-O-E-S-I-F states. For the purposes of this discussion a state is stored as three (3) encoded bits. When a cache controller, e.g., C1 sends a request 62 to read 64 a cache line Lx, from memory, the cache line Lx is marked or set with a "F" (forward) state in the directory. The memory controller gives the requesting cache controller C1 the cache line Lx (in this case of the line Lx being marked "F" in the directory), with the owned state "O", rather than a "S" state "Shared", as normally would occur in either the ARM CHI or the MOESI protocols. By having the state of the line given (i.e., "set") to the cache C1 with the "O" state this requires that the cache controller C1 that read the line Lx from memory cannot silently drop the line Lx, because while in the conventional MOESI coherency protocol, silently dropping the line is permitted for a shared state "S" silently dropping the line is not permitted for the owned "O" state.

In the MOESI protocol the S state is used to indicate that the cache line Lx with that state is one of several copies in the system (e.g., in other caches or memory). A cache that has a line with the S state "set" does not have permission to modify the copy, as other processors in the system may hold copies of the data in the Shared state. A shared cache line may be "dirty" (changed) with respect to memory if there is a cache that has a copy of the line in the Owned state. The cache controller given the cache line with the Owned state is responsible for eventually updating main memory. When a cache has a M line, the memory copy is not up to date, but no cache has an "O" state on that line. The cache line may not be written, but may be changed to the Exclusive "E" or Modified "M" state after invalidating all shared copies. (If the cache line was Owned before, the invalidate response will indicate this, and the state will become Modified, so the obligation to eventually write the data back to memory by the cache having the cache line in the Owned state remains.) The cache line may be discarded, i.e., changed to the "I" Invalid state at any time provided that the line is not in the M or O state. Caches having Shared cache lines may not respond to a snoop request with the Shared cache line.

Returning now to FIG. 2, a new reader device (e.g., processor core, cache, I/O interface, an accelerator device, etc.) here askes a cache controller C2 to request 72 a copy of the cache line Lx that is in the "F" state. The cache controller that controls the cache holding the copy of the line with F state is snooped, e.g., a bus request is received by that cache controller C1 to cause the cache controller C1 to read that cache line Lx from its cache and to supply the cache line Lx having the F state to cache controller C2. In the "MOESIF" protocol because the cache C1 that has the line in the F state was given the line in the Owned state that cache supplies the requested cache line to the new reader device (cache C2) in the shared state S. While the CHI protocol allows the cache with O stat to "pass_dirty", i.e., pass a dirty (changed) line to the new reader, that is an optional way of implementing CHI.

However, when the cache controller C1 that was given the cache line Lx in the O state (the directory actually tracks the cache line Lx in the F state) needs to evict the cache line Lx, the cache controller writes the cache line Lx back to the directory. However, the directory knowing that the line is in the F state can drop the write request and thus save memory bandwidth by reducing transactions on a memory bus.

The directory can implement the Forward state with options. A directory can be configured with respect to the choice to install a cache line as F. Several configurable choices can be provided. For example, the Forward state can be completely disabled or the Forward state can be installed on a cache miss (a requested line is not caches in any of the cache of the multicore system) or the Forward state can be installed on a cache hit (a requested line is in at least one of the caches).

Operating the directory such that the Forward state is completely disabled, would save mesh interconnect bandwidth as write transactions from cache controllers to directory for cache lines in the F state are eliminated. In a true F state, the cache C1 would only need to notify the directory of the eviction, and would not send the data.

Operating the directory such that the Forward state is installed on the cache line Lx for a cache miss provides an opportunity to forward lines from cache to cache. However, operating the directory to install a cache line as F on a cache miss, uses more bandwidth for write-backs than either disabling F or installed on a cache hit.

Operating the directory such that the Forward state is installed on a cache line for a cache hit is between the other two. When there are at least two caches using the cache line that provides a hint that the cache line is shared. However, lines with only one cache possessing the line will not cause write-backs. The drawback is that the line must be read from memory twice before it is put into F state.

The above three choices can be independently configured for I-stream and D-stream accesses. When the line is evicted from the cache it can be dropped at the directory, as mentioned above or written to memory based on a configuration setting. When the cache line with the state F "set" is written to memory, the cache line is tagged as an F state cache line. This lets the L3 cache decide to either allocate the cache line or not, based on configuration settings. If the cache line is allocated the cache line is marked as clean so that it does not need to be written to DRAM upon eviction from L3 cache. The decision to write the cache line with the F state to the L3 cache or not can be configured based on the number of CPU processor caches that are sharing the line. That number is a hint to the popularity of the line.

Figure 3:
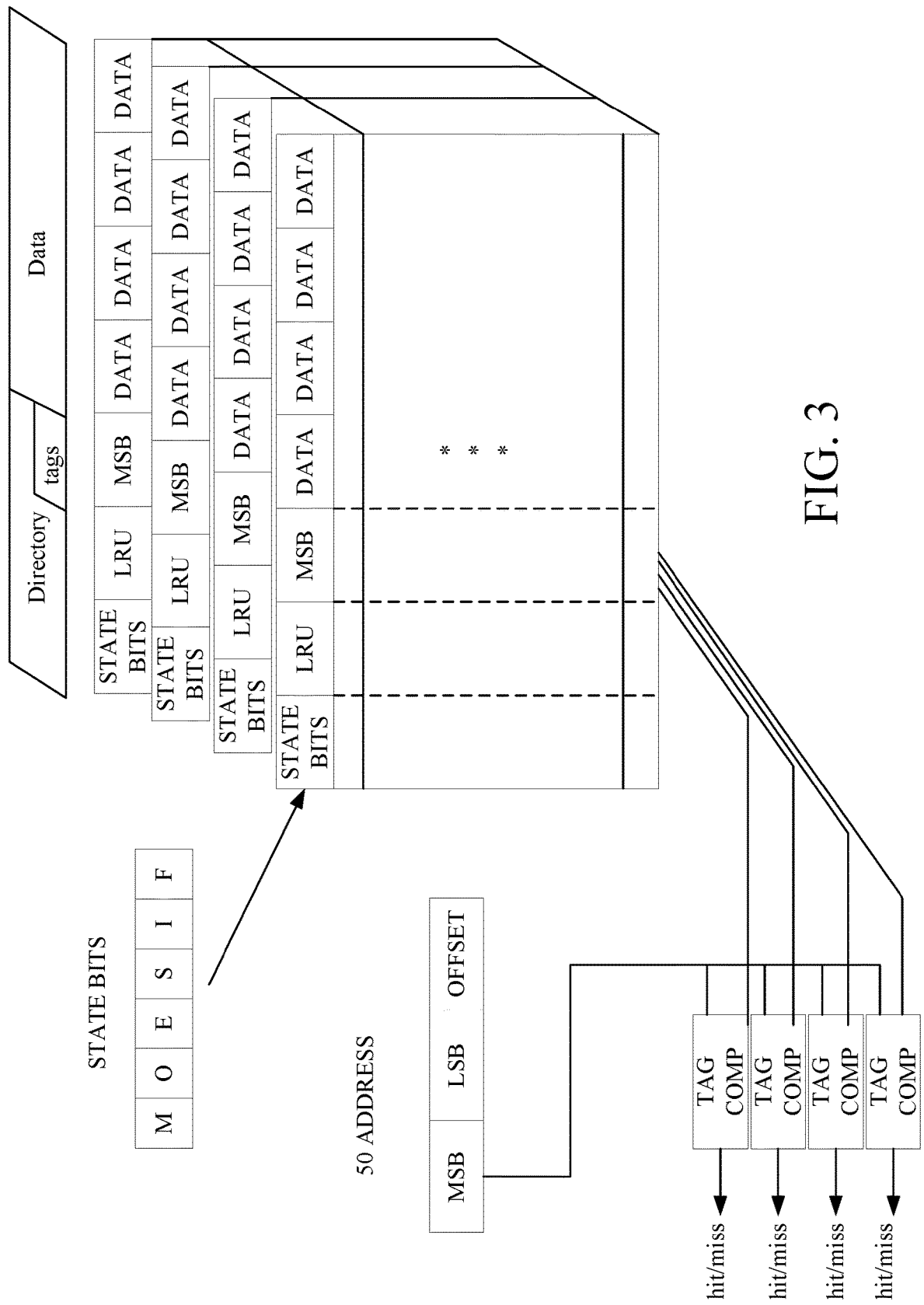
FIG. 3 is a block diagram of a set associative cache with MOESIF protocol bits.

Referring now to FIG. 3, a four way set associative cache 60 is shown. Cache 60 is exemplary of caches used in the caches of the circuit 10 of FIG. 1. Each way 62a-62d includes state, LRU, MSB, directory information and data. An incoming request has an address 64 that is examined, e.g., by comparing MSB's in each of four respective comparator circuits for a MSB tag that matches the MSB tag of the address. A match is a cache hit and no match is a cache miss.

As shown in FIG. 3 part of the directory state information includes the bits

| M | Modified | UniqueDirty (UD) |
|---|----------|------------------|
| O | Owned    | SharedDirty (SD) |
| E | Exclusive| UniqueClean (UC) |
| S | Shared   | SharedClean (SC) |
| I | Invalid  | Invalid (I)      |

| F | Forward | Forward |

The cache controller for the four way set associative cache 60 will maintain cache coherency with other caches in the system and/or with memory by use of the MOESIF protocol just mentioned above.

While the MOESIF protocol has been described in the context of an L2 cache in a multicore processor it need not be so limited. This protocol could alternatively be used in a single processor or other processor implementations to maintain coherency between cache and memory or among caches and memory. While the implementation of the system 10 discussed above envisions an L3 cache that is a front-end for memory so the L3 caches is always coherent with memory, other arrangements are possible.

3 Additional Systems

Various features of the techniques described herein can be implemented on the multi-core processor based systems as described in U.S. Pat. Nos. 7,577,820, and 7,805,575, and commonly-owned U.S. patent application Ser. Nos. 12/028,002, 12/582,443, and 12/885,957, each of which is incorporated herein by reference in its entirety.

Various techniques described herein can be implemented in additional types of integrated circuit architectures. For example, some techniques can be used in an integrated circuit with a single processor core, or an integrated circuit in which multiple processor cores include respective computation units interconnected by a shared interconnection network such as a bus, or a pipelined bus, in addition to a tiled integrated circuit architecture in which multiple processor cores are interconnected by a network of switches connected to respective computation units. Some techniques can be used in parallel processing environments that include multiple processes executing on a single processor, or multiple single-core and/or multi-core processors.

It is to be understood that the foregoing description is intended to illustrate and not to limit the scope of the invention, which is defined by the scope of the appended claims. Other embodiments are within the scope of the following claims.

What is claimed is:

1. A system comprises:
a multicore processor device including:
a plurality of cores, with multiple ones of the plurality of cores each comprising a processor; and
switching circuitry configured to couple the processor to a network among the plurality of cores; the system further comprising:
a directory that tracks status of cached lines, with the statuses comprising a modified state, an owned state, an exclusive state, a shared state, an invalid state, and an forwarded state;
a cache controller for implementing a cache coherency, with the cache controller configured to:
receive by the directory a read request from a reader device to read a cache line; change in the directory a first state of the requested cache line to a forward state; and
supply the requested read cached line with an owned state to the requesting reader device; and
determine that the cache line at the forward state needs to be evicted from the cache, the cache line is written back to the directory and the directory upon receiving the written back cache line, the directory is configured to drop the write back.

2. The system of claim 1 wherein when the directory supplies the reader device with the cache line in the owned state, the owned state requires that the reader device cannot silently drop the cache line.

3. The system of claim 1 wherein a cache controller of the requesting device that was given the cache line in the owned state is responsible for updating the owned cached line to memory.

4. The system of claim 1 wherein the cache controller is a first cache controller, the system further comprising:
a second cache controller that has the cache line with the owned state updates main memory with the cache line in the owned state.

5. The system of claim 1, further configured to:
receive a request for the cached line from a second, different reader device;
cause a snooping request to be sent to the reader device that holds the copy of the cache line with the forward state, with the request being to supply the cache line to the second different reader device with a shared state.

6. The system of claim 1, wherein the cache controller is further configured to:
receive a request for the cached line from a second, different reader device to cause the cache controller to determine that the cache line needs to be evicted; and
evict the cache line from the cache of the requesting reader device.

7. The system of claim 1 wherein the directory implements the forward state with configuration options.

8. The system of claim 7 wherein the configuration options include one or more of disable, or install the forward state on a cache miss, or install the forward state on a cache hit.

9. The system of claim 7 wherein the configuration options are independently configurable for I-stream and D-stream accesses.

10. The system of claim 6 wherein the directory implements the forward state with configuration options, and according to the configuration options configured for the cache line, when the cache line is evicted from the cache, the cache line is either dropped at the directory or written to memory based on the configuration option.

11. The system of claim 1 wherein when the cache line having the forward state is written to memory, the system is further configured to:
tag the cache line as a forward state cache line.

12. The system of claim 11 wherein the system includes three cache levels, an L1 level, an L2 level with the L2 level being larger in size than the L1 level, and an L3 level with the L3 level being larger in size than the L2 level.

13. The system of claim 12 wherein the L3 cache, upon receiving the tagged cache line, is configured to determine to:
either allocate the tagged cache line or not, based on configuration settings;
if the cache line is allocated, the cache line is marked as clean so that it does not need to be written to DRAM upon eviction from the L3 cache.

14. A method of implementing cache coherency in a computing system, the system including a multicore processor device that includes a plurality of cores, with multiple ones of the plurality of cores each including a processor; and switching circuitry configured to couple the processor to a network among the plurality of cores; the system further including a directory that tracks status of cached lines, with the statuses comprising a modified state, an owned state, an exclusive state, a shared state, an invalid state, and an forwarded state and a cache controller for implementing a cache coherency, with the method comprising:
- receiving by the directory in the system, a read request from a reader device to read a cache line;
- changing in the directory a first state of the requested cache line to a forward state;
- supplying the read cached line with an owned state to the requesting reader device; and
- determining that the cache line at the forward state needs to be evicted from the cache; and with the cache line written back to the directory and the directory receiving the written back cache line is configured to drop the written back cache line.

15. The method of claim 14 wherein when the directory supplies the reader device with the cache line in the owned state, the owned state requires that the reader device cannot silently drop the cache line and a cache controller that has the owned cache line is responsible for updating the owned cached line to memory.

16. The method of claim 14 wherein the directory tracks six states for cache coherence, with the six states being a modified state, the owned state, an exclusive state, a shared state, an invalid state and the forward state.

17. A computer program product tangible stored in a computer readable, hardware storage device, the product for configuring a cache controller to maintain cache coherency in a system that includes a multicore processor device that includes a plurality of cores, with multiple ones of the plurality of cores each including a processor, and switching circuitry configured to couple the processor to a network among the plurality of cores, the system further including a directory that tracks status of cached lines, with the statuses comprising a modified state, an owned state, an exclusive state, a shared state, an invalid state, and an forwarded state and a cache controller for implementing a cache coherency, with the computer program product comprising instructions to cause a processor to:
- receive by the directory a read request from a reader device to read a cache line from;
- change in the directory a first state of the requested cache line to a forward state;
- supply the requested read cached line with an owned state to the requesting reader device; and
- determine that the cache line at the forward state needs to be evicted from the cache, the cache line is written back to the directory and the directory upon receiving the written back cache line, the directory is configured to drop the write back.

18. The computer program product of claim 17 wherein the directory implements the forward state with one or more configuration options.

19. The computer program product of claim 18 wherein the one or more configuration options are at least one configuration option comprising disable the forward state, enable forward state with a cache miss or enable forward state on a cache hit.

20. The method of claim 14 further comprising: configuring the forward state with one or more configuration options that are a disable the forward state option, an enable forward state with a cache miss option or an enable forward state on a cache hit.

* * * * *